United States Patent
Jung et al.

(10) Patent No.: US 10,491,574 B1
(45) Date of Patent: Nov. 26, 2019

(54) SECURE STORAGE AND TRANSPORT WITH CLOUDS

(71) Applicant: Collavate Inc., Los Altos, CA (US)

(72) Inventors: Sung Wook Jung, Palo Alto, CA (US); Seo Young Kim, San Jose, CA (US)

(73) Assignee: Collavate Inc, San Jose, CA (US)

( * ) Notice: Subject to any disclaimer, the term of this patent is extended or adjusted under 35 U.S.C. 154(b) by 135 days.

(21) Appl. No.: 14/727,711

(22) Filed: Jun. 1, 2015

(51) Int. Cl.
| | |
|---|---|
| *G06F 21/60* | (2013.01) |
| *H04L 29/06* | (2006.01) |
| *G06F 21/62* | (2013.01) |
| *H04W 12/08* | (2009.01) |

(52) U.S. Cl.
CPC ...... *H04L 63/0464* (2013.01); *H04L 63/0861* (2013.01); *H04L 63/10* (2013.01); *H04L 63/105* (2013.01); *G06F 21/6218* (2013.01); *H04L 63/102* (2013.01); *H04W 12/08* (2013.01)

(58) Field of Classification Search
CPC .............................. G06F 21/60; G06F 17/30
See application file for complete search history.

(56) References Cited

U.S. PATENT DOCUMENTS

| | | | |
|---|---|---|---|
| 2011/0197159 A1* | 8/2011 | Chaganti | H04L 29/06 715/781 |
| 2013/0254536 A1* | 9/2013 | Glover | G06F 21/6209 713/165 |

* cited by examiner

Primary Examiner — Izunna Okeke

(57) ABSTRACT

Automated secure document and text communication. Secure messages using metadata to transmit hidden encryption keys. Cloud-based collaboration on always-encrypted documents and metadata; cloud-based collaboration on documents and metadata using virtual machines. Maintaining a distributed log for message path tracing, coupled to the message and securely encrypted, even when the message is securely encrypted. Secure message communication over a multi-hop path, that can alter encryption at each hop, adjust security measures at each hop, and include and log biometric sensors at each hop. Secure message communication, using media that can be manipulated by cameras, fax machines, photocopiers, printers, scanners, smart phones, or variants thereof. Free and substantially noiseless conversion of messages between digital and physical form. Secure message communication using multi-media to ensure non-interception and lack of machine readability if intercepted. Secure, non-interceptable, and uncopyable communication of crypto-currencies. Steganography only recognizable by human beings, or only human beings with altered vision.

19 Claims, 2 Drawing Sheets

SECURE STORAGE AND TRANSPORT WITH CLOUDS

1 INCLUDED DOCUMENTS

Figure 1:
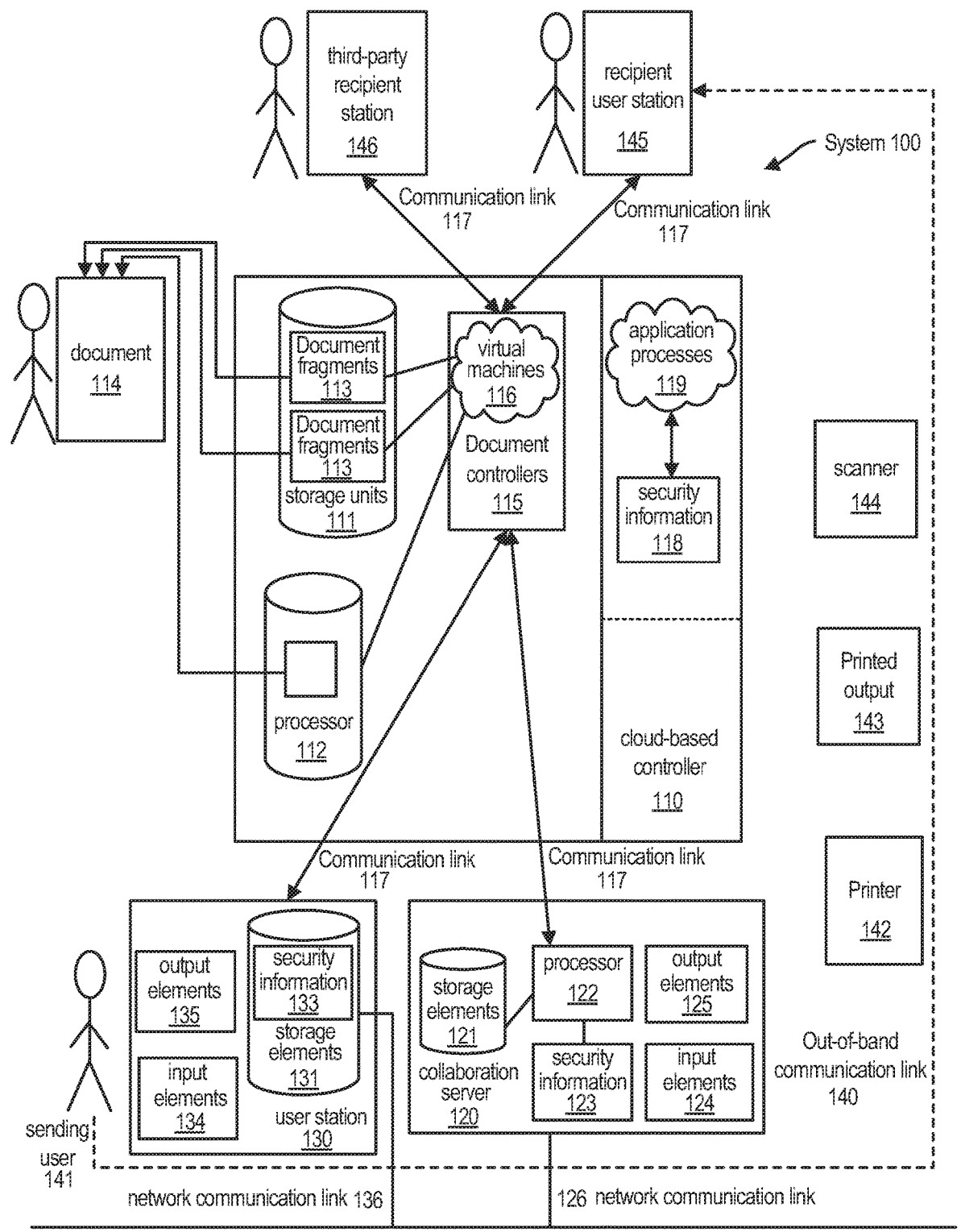

This Application describes technologies that can be used with inventions, and other technologies, described in one or more of the following Applications, each assigned to the same assignee: Collavate, Inc. These documents are sometimes collectively referred to herein as the "Included Documents", "Incorporated Disclosures", or variants of those phrases.

Application Ser. No. 14/675,750, filed May 3, 2015, in the name of Sung Wook Jung, Kenneth D. Lee, and Yeo Sub Lee, titled "Smart metadata in cloud-based entities"; and Application Ser. No. 14/709,486, filed May 12, 2015, in the name of Sung Wook Jung, Seo Young Kim, Yeo Sub Lee, titled "Management of metadata with clouds".

Each and every one of these documents, as well as all documents cited therein, are hereby incorporated by reference as if fully recited herein.

No aspect of incorporating these documents by reference is intended to be limiting in any way. The scope and spirit of the invention remains as broad as possible, given the specification and claims of this Application. These Included Documents are additive in nature, and can be combined with the technical matter described herein, in whole or in part.

2 BACKGROUND

2.1 Field of the Invention

This Application relates to management of metadata with clouds. In one possible implementation, this Application can include one or more cases, such as when the metadata is associated with a document, such as its author or creation time. Other and further possibilities are described herein.

2.2 Related Art

With the increased communication afforded by the internet, it has become popular to share documents among multiple users, such as for common review or for collaborative editing. Documents are often shared by storage with, and common access within, a cloud service provider. There are many known cloud service providers, such as Apple ("iCloud"), Google ("Google Docs"), Microsoft ("Office 365"), and others.

It can also sometimes occur that a sender wishes to collaborate on a documents with another user, or to transfer a document to another user, while maintaining one or more portions of the document confidential, such as against adversaries in the shared storage. It can also sometimes occur that a sender wishes to collaborate on or transfer a document, while maintaining an encryption key that is substantially random and difficult to memorize. It can also sometimes occur that a sender wishes to collaborate on or transfer a document, such as using encryption, while using a different communication channel for encryption keys, such as one or more channels that have lesser visibility and greater resistance to discovery, greater resistance to discernment of purpose, greater resistance to readability, greater resistance to understanding, and other security features. These problems can be subject to the same concerns as those described above.

2.3 Some Drawbacks of the Known Art

Each of these issues, either alone or in combination with others (whether mentioned herein or otherwise), at some times, or in some conditions, can cause one or more problems with respect to collaborating on or sending documents in a cloud service provider, or operations related thereto, with respect to other matters, or some combination or conjunction thereof.

3 BRIEF SUMMARY OF THE DISCLOSURE

3.1 This Application

This Application provides patentable subject matter that can ameliorate the problems described above, as well as others.

In one possible implementation, the content of the document can be maintained in one encrypted form, and the metadata associated with the document can be maintained separately from the content of the document, possibly in another encrypted form, with the effect that control can be separated between access to the content of the document and access to the metadata. This effect can provide a pioneering technology, generally enabling new and unique capabilities having to do with the nature of "documents"; access and sharing thereto, collaboration therewith and/or security thereof; their content and/or metadata; and their very existence.

In one possible implementation, the metadata associated with a document transmitted from a sender to a recipient can include one or more encryption keys or decryption keys (such as the sender's public keys in an asymmetric key system), or portions thereof. This can have the effects that:

The sender can be assured that the document is not available in unencrypted form to any unauthorized party.

The recipient can be determine the sender's public key from examination of the metadata.

The sender and the recipient can be assured that their private keys are not shared or send to each other, with the effect that they are not available in unencrypted form for any unauthorized party.

A cloud-based storage system can maintain the document and its metadata, with the effects that:

The sender, knowing the recipient's public key, can securely send or share the document and its metadata with the recipient.

The recipient, by examining the document's metadata, can securely send or share messages or other documents with the sender.

Neither the private key for the sender or the recipient is shared or sent to any other party.

Since the document can be stored in multiple parts, the security information to access that document can be stored in metadata associated with the multiple parts of the document, that is, also in multiple parts.

In one possible implementation, encryption and decryption can use an asymmetric key system, with the effects that:

The sender can maintain a public key for securely encrypting and sending the document and its metadata to the recipient.

The recipient can maintain an associated private key for securely receiving and decrypting the document and its metadata.

For one example,

The sender can know the recipient's public key.

The sender can securely send a document to the recipient, encrypted using the recipient's public key, with the effect that no unauthorized party can obtain the document. The recipient can securely decrypt the document using its own private key.

The sender can send its own public key in the document's metadata, with the effect that the recipient can obtain the sender's public key by examining the metadata. The recipient can reply to the sender using the sender's public key, and the sender can decrypt the reply using its own private key.

Neither the private key for the sender or the recipient is sent or shared with any other party, that is, each of the sender and recipient maintains its own private key confidential.

In one possible implementation, this technology can repurpose a broad range of devices as encryption/decryption tools, with the effect that virtually any document can be embedded during transport into one or more of a wide range of physical objects. This broad range of physical documents can have a wide range of effects applied thereto, such as one or more of: de-assembly and reassembly, physically manipulation, storage and retrieval, and/or combinations and conjunctions thereof.

In another possible implementation, this technology can repurpose a broad range of documents as storage media, with the effect that many different kinds of objects can maintain data robustly and securely.

In another possible implementation, this technology can provide transfer of documents concurrently with security, thus assuring that use of a multi-hop network path does not reduce security confidence or granularity of security for any one of the hops in that multi-hop network path, even one that extends across a multi-hop network. This technology can also provide concurrent editing of documents and/or their metadata collaboratively with security, thus assuring that use of a multi-hop network path in a multi-hop network does not reduce security or granularity of security for any one of the hops in that multi-hop network path, even one that extends across a multi-hop network.

In another possible implementation, this technology can maintain a complete yet robust audit trail of data transfers in a decentralized peer-to-peer environment. This audit trail can be deliberately maintained distributed among multiple devices, with the effect of requiring more work to collect but also more secure against adversarial review, or can be deliberately maintained at one or more "central" servers, with the effect of requiring less work to collect but also less secure against adversarial review.

Although many possible implementations are described herein with respect to printers, paper, and scanners; in the context of the invention, there is no reason for any such limitation. After reading this Application, those skilled in the art would recognize that many variations are within the scope and spirit thereof, and would be workable with undue experiment or new invention.

3.2 System, Method, and Devices

In one possible implementation, a cloud-based system can include one or more storage devices, each of which can include one or more documents. The cloud-based system can be associated with one or more processes or threads, such as might be executed or interpreted by one or more computing devices. Each document can also be associated with both content and a collection of metadata, the document-metadata pair of which can possibly be, in one or more cases thereof, encrypted with a key-pair in an asymmetric key system, and the document-metadata pair can be copied, either with or without its key-pair.

In another possible implementation, a document can be communicated from a sender to a recipient using an out-of-band communication link to communicate security information, one example of the security information possibly including a public key of a key-pair associated with the recipient. For one example, the sender can contact the recipient by telephone and ask for a public key in a key-pair known to the recipient. This public key can itself be encrypted, and its encrypted form associated with the document as metadata. The document and its metadata, the latter being at least partly encrypted, can be communicated from the sender to the recipient using the cloud-based system. For example, the sender can encrypt the document and its metadata (more precisely, pointers thereto) and place them in one or more locations known to the recipient for receiving messages.

In another possible implementation, the out-of-band communication link can include transport of physical media, such as paper with the security information associated with the document (and its metadata) printed on it, one example of the security information again possibly including a private key of a key-pair associated with the recipient. The key can be printed in a machine-readable format, such as one that can be scanned by a printer/scanner and translated into electromagnetic signals, which themselves can be stored in a non-transitory or transitory memory and/or mass storage. The key can also be printed in a human-readable format, such as one that can be read by a person looking at alphanumeric digits, or other characters, or variants thereof. These alphanumeric digits, or variants thereof, which themselves can be printed in "ASCII art", such as shapes that are recognizable to a human being (or such as shapes only recognizable to a human being with a selected type of color-blindness), but are actually composites of characters when viewed by a processor, with the effect that the key can be read by the recipient without substantially being readable by scanners or similar devices on its path.

In one such alternative case, the physical media can have an out-of-band communication link that includes physical transport of a tangible object, and may include physical warping, mangling, or other treatment, such as tearing or overwriting, of that tangible object. In alternatives or variants of such cases, the physical media can have an out-of-band communication link that includes transformation of a set of information represented by that tangible object into or out of a machine readable format. For one example, paper can be copied by a photocopiers, fax machines, printers or scanners, or variants thereof, such as might be found in many offices still using 20th Century technology, or by machine learning techniques that can classify imprecise characters into precise variants thereof. For another example, paper can be photographed by an analog or digital camera, a "smartphone", or a variant thereof. For another example, paper can be torn into more than one piece, and the pieces sent by different paths to the recipient. For another example, paper can even be hidden in an unusual locations, such as 3-ounce tubes of toothpaste.

In another such alternative case, both electronic and physical media can include further security assurances at each hop in a multi-hop path of a multi-hop cloud-based system (such as, at the recipient of that multi-hop communication), such as rechecking for additional passwords, keys, or other authentication techniques, or combinations or conjunctions thereof, to reduce the likelihood of a message being transported, even on physical media, to an erroneous recipient. For one example, biometric devices can be used to confirm requests for access, by one person or by two or more persons, as authentication information might be maintained in a database, such as a distributed fault-tolerant database. For example, such biometric devices can include 3D dental recognition, face recognition, fingerprint recognition, handwriting and signature recognition, iris recognition, microemotions, voice recognition, and/or otherwise.

In another such alternative case, the metadata associated with a document transmitted from a sender to a recipient can include one or more encryption keys or decryption keys, or portions thereof, with the effect that the sender and the recipient can be assured that the document and its metadata are not available in unencrypted form to any unauthorized party. The cloud-based storage system can maintain the document and its metadata, securing the metadata so that it is not available in unencrypted form to any unauthorized party. For one example, the cloud-based storage system can encrypt the metadata against use by unauthorized parties, and only provide decrypted keys from the metadata to authorized parties. For another example, the cloud-based storage system can include a security server, coupled to the cloud-based storage system, that maintains the metadata in encrypted form, and only provides decrypted keys from the metadata to authorized parties. For another example, the metadata can be encrypted by the sender and decrypted by the recipient, with a nonce encryption key (or nonce key-pair in an asymmetric key system) exchanged between the sender and recipient, such as using a Diffie-Hellman secure key exchange technique. In such cases, since the document can be stored in multiple separate parts, its security metadata can be split up and allocated to those multiple separate parts, with the effect that attacks against the security would involve attacks against the security of each of the multiple separate parts of the document.

In alternative such cases, when a document is transmitted from a sender to a recipient, that document's associated metadata can include one or more encryption keys or decryption keys (such as public keys and private keys in a key-pair in an asymmetric key system), or portions thereof. In such cases, the document and its metadata are maintained hidden from unauthorized parties, and the key-pair is also maintained hidden from unauthorized parties. For one example, a cloud-based storage system can encrypt the document using a public key associated with the recipient, encrypt the document's metadata using a second public key known only to the sender and the recipient, with the effect that the recipient can decrypt the metadata, obtain the private key to decrypt the document, and decrypt the document. The key-pair for transmission can also be maintained at a security server coupled to the cloud-based storage system, or by a trusted third party coupled to the cloud-based storage system. There is no particular requirement for a decryption key to be sent or shared in the clear at any time.

In alternative such cases, when a document is transmitted from a sender to a recipient, the sender and recipient can each have earlier obtained the private key and public key associated with a common key-pair in an asymmetric encryption system. For one example, (A) the sender and the recipient can exchange a nonce key-pair for transmitting the document from the sender to the recipient; and (B) since the sender and the recipient each have both the public key and the private key for the nonce key-pair, each one can encrypt messages to the other using the same public key, and each one can decrypt messages from the other using the same private key. Even if the sender and the recipient each use different key-pairs, the sender can insert its own public key into the document's metadata, with the effect that the recipient can reply to the sender using that public key. Moreover, that public key in the document's metadata can be encrypted using the recipient's public key, with the effect that only the sender and the recipient know each other's public key, with the effect that an exchange of messages between the sender and recipient is secure against adversaries.

In another such alternative case, both electronic and physical media can include additional security assurances at each hop in a multi-hop path of a multi-hop cloud-based system (such as, at the recipient of that multi-hop communication). For example, this can include re-encryption with both the known key and a new key-pair, possibly combined with de-encryption using the original key-pair, or further encryption with both the new known key, a new key-pair, and additional information. In the latter example, the media received at a particular hop in a multi-hop path can have its original information appended with the private key (for decryption) of the original key-pair, new information appended, and re-encrypted with a new public key of a new key-pair, with the effect that each hop in the multi-hop path can append information, such as a path trace or a time/place log of where and when the message was routed. A time/place log can be useful in tracing the message path, such as for accountability, debugging, forensic, or traffic analysis purposes.

In another such alternative case, both electronic and physical media can include digital information with realworld effect, such as 3D or 4D printing plans, which can be used to direct a 3D or 4D printer to make real objects ("4D objects" can refer to objects that change shape under selected conditions, such as temperature), computer malware, which can be used to disrupt real devices coupled to a computing device, computer software, which can be used to control computing devices and their peripherals, cryptocurrencies, which can be used to conduct business, DNA and RNA strands, which can be used to conduct biological computation, and virtual machines and their processes, which can be used to control elements of a distributed or emulated computing device.

In another possible implementation, both electronic and physical media can include digital information hidden within them, such as using steganography or another technique for hiding information. For one example, a digital still picture or a digital movie can have superfluous bits maintained including document content, document metadata, and document security information. For another example, a printed picture or printed text document can include superfluous bits, such as maintained in micro-errors in its ASCII art, including similar information as can be maintained by a digital still picture.

In another possible implementation, more than one user can collaborate on reading and modifying a document, concurrently with the document being maintained encrypted for security protection against possible adversaries. For one example, for a particular document, a process can periodically, or otherwise from time to time, de-encrypt the particular document for possible use by a selected user, make any changes by that selected user, and re-encrypt the particular document. For another example, for a particular document, each one of a particular set of users can maintain security information for the particular document and at least a portion of its metadata, a selected one of that particular set of users can "check out" the document by altering its metadata to alert all other users in that particular set while also decrypting the document content, the selected one user can read or modify the document, and the selected one user can "check in" the document by altering its metadata to alert all other users in that particular set while also re-encrypting the document and at least a portion of its metadata. For another example, for a particular document, the document and at least a portion of its metadata can be maintained by a virtual machine, each one of a particular set of users can direct the virtual machine to read or modify the document and inform all others ones of that particular set; when operations on that document are complete, the document and its metadata can be maintained by the cloud-based system, while the virtual machine is reallocated to other functions, or shut down.

In another possible implementation, each document can be associated with one or more processes or threads, such as similar to the threads described above, and/or otherwise. As described herein, the one or more threads associated with each document can be maintained non-transitorily or transitorily in memory or mass storage, locally or remotely to the particular computing device with which they are associated, readable by a computing device associated with the memory or mass storage. In one or more such cases, the computing device can include a processor or another hardware device capable of performing the functions described herein, or otherwise performing functions associated with a Turing-equivalent computing device, or can include a virtual machine emulated by a hypervisor.

Other and further details are described herein.

3.3 Possible Applicability

After reading this Application, those skilled in the art would recognize that techniques shown or suggested herein are applicable to more than just the specific embodiments or possibilities shown herein, are within the scope and spirit of the invention, and would not require undue experiment or further invention. Some particular implementations include one or more of the following, possibly in combination or conjunction:

- automated secure document and text communication, such as e-mail, instant messages, and text messages;
- cloud-based collaboration on always-encrypted documents or metadata;
- maintaining a log for tracing message paths, even for secure and encrypted message communication;
- secure communication of physical devices;
- secure message communication over a multi-hop path, that can alter encryption keys and techniques at each hop; adjust security measures at each hop, and include biometric sensors for authentication;
- secure message communication, using media that can be manipulated by cameras, fax machines, photocopiers, printers, scanners, smart phones, or variants thereof, to easily, freely, and noiselessly convert a message between digital and physical form, without substantial error;
- secure message communication, using other media to ensure non-interception, and to ensure lack of machine readability even if intercepted;
- secure, non-interceptable, and uncopyable communication of crypto-currencies;
- steganography only recognizable by human beings.

Other and further techniques are also shown and suggested herein. Those embodiments and possibilities shown herein are applicable to more than just the specific embodiments and possibilities shown herein.

4 BRIEF DESCRIPTION OF THE FIGURES

Figure 2:
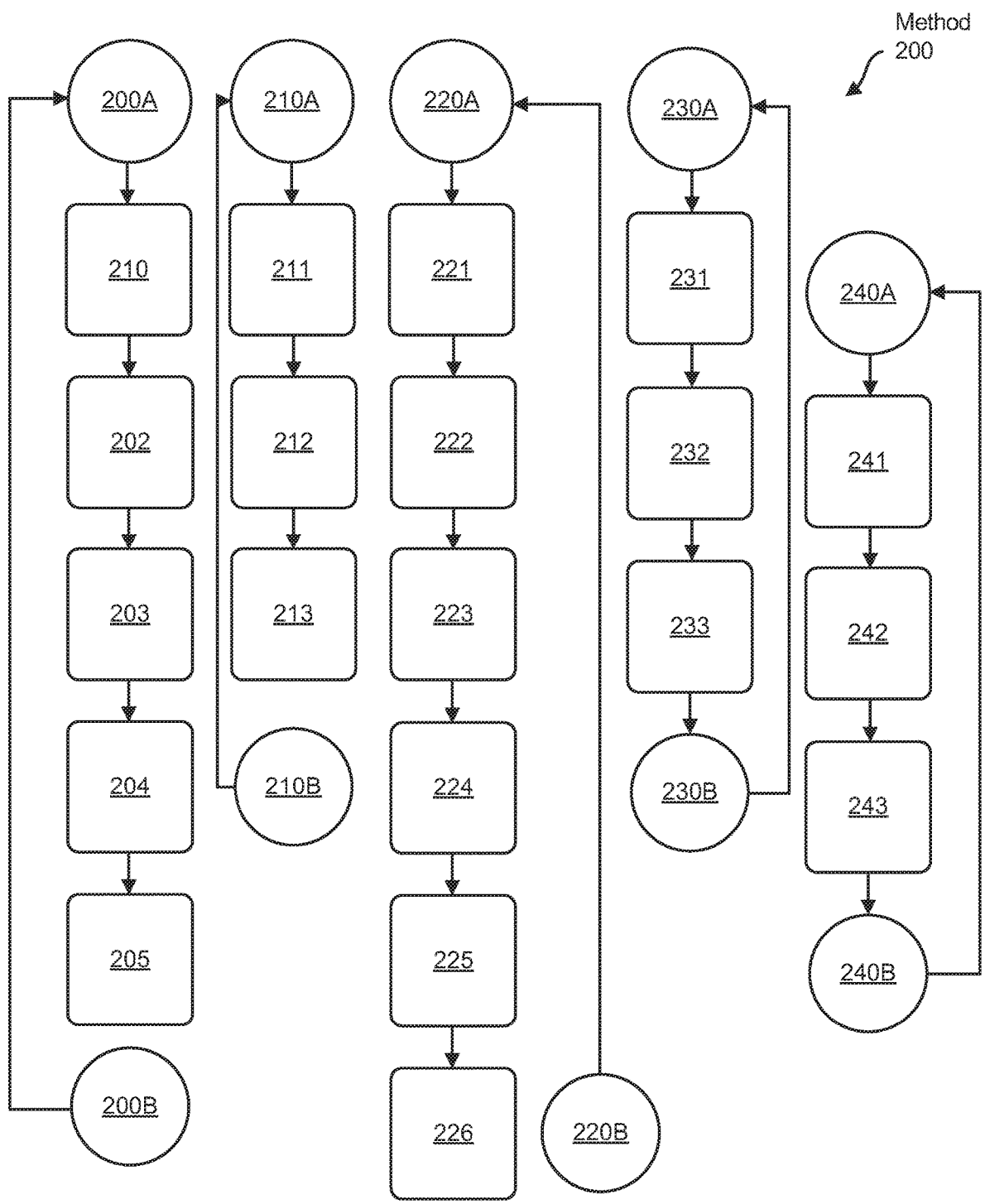

FIG. 1 shows a conceptual drawing of a system.
FIG. 2 shows a conceptual drawing of a method.

5 DETAILED DESCRIPTION OF AN EMBODIMENT

5.1 Terminology

5.1.1 Generality of the Description

Ideas and technologies shown or suggested by this Application should be thought of in their most general form, including without limitation, considering one or more of the following:

- The phrases and terms "Application," "this Application," "this Disclosure," and variants thereof, generally refer to this Specification, Drawings, Figures, and Claims, all other parts of this Application, and all facts known in the art at the time of filing, and all facts that can be rationally concluded therefrom.
- When an apparatus element or a method step is said to "include", "perform", and variants thereof, or otherwise be restricted in some way, this Application should be read that the subpart of the apparatus element, or the substep of the method, and the restriction mentioned, is only optional, not required. After reading this Application, those skilled in the art would recognize that those apparatus elements or method steps need not necessarily include or perform those subparts or substeps. In the context of the invention, no such particular subparts or substeps are particularly required. In an alternative embodiment, apparatus elements or method steps without those subparts or substeps would be workable, are within the scope and spirit of the invention, and would not require undue experiment or further invention.
- The phrases and terms "in one embodiment", "in one implementation", "in one scenario" and variants thereof, generally refer that a particular characteristic, feature, or structure, described herein is included in at least one embodiment of the invention. Multiple uses of this phrase do not necessarily all refer to the same embodiment. Rather, the specific particular characteristic, feature, or structure, described herein might be combined in any suitable manner into one or more distinct possible embodiments.
- The phrases and terms "perform" and variants thereof, generally refer (in the context of a program of instructions) any one or more means by which those instructions are executed or interpreted, or a device (such as a computing device) otherwise conducts the process indicated by that program of instructions. A program of instructions can be detected or interpreted at one location, and executed or its process conducted at another location. A program of instructions can be performed by a portion of a device, rather than the entire device, or by one or more devices, or by one or more portions of devices (the same device or different devices). A program of instructions can be performed by an emulated device, such as a virtual machine, "sandbox" environment, or otherwise. A program of instructions can be performed in part, halted or paused or stopped, transferred to another device, in whole or in part, and possibly continued.

The phrases and terms "relatively" and variants thereof, generally refer any relationship in which a comparison is possible, including without limitation "relatively less," "relatively more," and otherwise. In the context of the invention, where a measure or value is indicated to have a relationship "relatively," that relationship need not be precise, need not be well-defined, and need not be by comparison with any particular or specific other measure or value. For one example, whenever a measure or value is "relatively increased" or "relatively more," that comparison need not be with respect to any known measure or value, but might be with respect to a measure or value held by that measurement or value at another place or time, or with respect to a measure or value commonly used in the art.

The phrases and terms "substantially" and variants thereof, generally refer any circumstance in which a determination, measure, value, or otherwise; is equal, equivalent, nearly equal, nearly equivalent, or approximately; what the measure or value is recited to be.

For one example, The phrases and terms "substantially all" and variants thereof, generally refer any circumstance in which all, except possibly a relatively minor amount or number, have the stated property.

For another example, The phrases and terms "substantially none" and variants thereof, generally refer any circumstance in which none, except possibly a relatively minor amount or number, have the stated property.

For another example, The phrases and terms "substantial effect" and variants thereof, generally refer any circumstance in which an effect might be detected or determined.

The phrases and terms "techniques" and variants thereof, generally refer any material suitable for description, including without limitation all such material within the scope of patentable subject matter. Whenever a method step is described, those skilled in the art would know, without further invention or undue experiment, that this application thereby also describes (1) at least a first product, such as one maintaining instructions that are interpretable by a computing device, where those instructions direct one or more devices to perform that method step; and (2) at least a second product, such as one capable of performing that method step.

5.1.2 Specific Phrases and Terms

One or more of the following phrases and terms can be used in this Application. Where clear from the context, they can have the meanings described herein. After reading this Application, those skilled in the would recognize that these phrases and terms can have other, broader and further, meanings as well or instead.

The phrases and terms "cloud" and variants thereof, generally refer any one or more communication links and/or storage elements, coupled in any configuration that allows external devices to access the storage elements and/or combinations or conjunctions thereof.

For one example, The phrases and terms "cloud-based storage system" and variants thereof, generally refer any one or more systems including storage devices maintained on a "cloud", as described above. In such cases, the cloud-based storage system can maintain information regarding authorized users, documents, metadata associated with those documents, encryption and decryption keys or key-pairs, and other tags associated with documents.

The phrases and terms "hop", "multi-hop" and variants thereof, generally refer any one or more communication links and cloud-based systems, coupled in any configuration that allows devices coupled to one cloud to send documents or metadata from that one cloud to another cloud.

The phrases and terms "key", "key-pair", "encryption key", "decryption key", "encryption system", "asymmetric encryption system" and variants thereof, generally refer any one or more techniques for sending, sharing, transmitting, or receiving, documents or messages from a sender to a recipient, including any encryption or decryption keys or key-pairs necessary or useful for maintaining that information secure against adversaries, and including any encryption or decryption keys or key-pairs necessary or useful for authorized users to obtain those documents or messages.

The phrases and terms "printer", "scanner" and variants thereof, generally refer and related devices, any one or more devices capable of printing on paper from an image in a memory of a computer device, or capable of obtaining an image in the memory of a computer device in response to an image on one or more pages of paper.

The phrases and terms "receiver", "sender", "user", "vendor" and variants thereof, generally refer any one or more of the following: persons, devices, software elements, or groups thereof, authorized or capable of interacting with one or more portions of a system disclosed herein, or authorized or capable of triggering one or more steps of a method disclosed herein. For one example, a "user" can include one or more persons; one or more programs disposed to make requests of, and receive responses from, the system; one or more software elements disposed to control the system or method; an artificial intelligence or machine learning technique capable of interacting with the system or method; and/or combinations or conjunctions thereof.

The phrases and terms "security server", "trusted third party" and variants thereof, generally refer any one or more persons or devices allowed by both senders and recipients of messages to maintain keys or key-pairs for encrypting or decrypting those messages, including without limitation keys and key-pairs in asymmetric encryption systems and symmetric encryption systems.

The phrases and terms "station", "receiving user station", "sending user station", "user station" and variants thereof, generally refer any device coupled to one or more communication links or cloud-based systems, coupled in any configuration that allows those devices to send or receive messages to or from any one cloud.

Any terms appearing in the figures but not explicitly described in this Application should be apparent to those skilled in the art.

5.2 Figures and Text

FIG. 1 shows a conceptual drawing of a system.
FIG. 2 shows a conceptual drawing of a method.
FIGS. 2A-2G are sometimes collectively referred to herein as "FIG. 2".

5.3 System Elements

FIG. 1 shows a conceptual drawing of a system.

5.3.1 Element Identifiers

System elements and sub-elements are sometimes described herein with respect to the following reference numbers and/or names:

100 system (as shown in FIG. 1)
  110 cloud-based controller
    111 storage units
    112 processor
    113 document fragments
    114 document
    115 document controllers
    116 virtual machines
    117 communication link
    118 security information
    119 application processes
  120 collaboration server
    121 storage elements
    122 processor
    123 security information
    124 input elements
    125 output elements
    126 network communication link
  130 user station
    131 storage elements
    132 processor
    133 security information
    134 input elements
    135 output elements
    136 network communication link
  140 out-of-band communication link
    141 sending user
    142 printer
    143 printed output
    144 scanner
    145 recipient user station
    146 third-party recipient station
  150 network link

5.3.2 System Elements

In one possible implementation, a system 100 can include elements described herein, other elements shown in the figure, and possibly other elements. Not all elements are required. Elements should be considered optional, unless otherwise specified or unless clearly obvious for operation of the system. Elements should also be considered to be embodied in one or more devices, not necessarily in only a single device.

In another possible implementation, the system 100 can include a cloud-based controller 110, a collaboration server 120, one or more user stations 130, an out-of-band communication link 140, and (optionally) a network link 150, such as a communication link to the internet.

In another possible implementation, the cloud-based controller 110 can include one or more storage units 111 and one or more processors 112. The one or more storage units 111 can each optionally include one or more document fragments 113, which can collectively represent a document 114 and its metadata. The one or more processors 112 can each also optionally include one or more document controllers 115, each of which can include one or more virtual machines 116, each of which can perform one or more processes or threads under control of a hypervisor (not shown in this figure), to control operations on the document 113 and its metadata 114. The document controllers 115 can include one or more communication links 117 to one or more (possibly virtual) processes each operating on one or more processors 112, the cloud-based collaboration server 120, and to each of the user stations 130. The one or more processors 112 can collectively operate one or more (possibly virtual) processes, each capable of decrypting/re-encrypting the document 113 and at least some of its metadata, using security information 118 (such as a key-pair in an asymmetric cryptographic technique, or a variant thereof). The cloud-based controller 110 can also include one or more application processes 119, also capable of decrypting/re-encrypting the document 113 and at least some of its metadata, using security information 118.

In another possible implementation, each collaboration server 120 can each include one or more storage elements 121, one or more processors 122, security information 123 (such as a key-pair in an asymmetric cryptographic technique, or a variant thereof), input elements 124, output elements 125, a communication link 117 with the cloud-based controller 110, and (optionally) a network communication link 126 with the network link 150. The one or more processors 122 can collectively control collaboration server 120.

In such cases, one or more users 127 can be associated with the collaboration server 120, and can make requests of it, such as using the input elements 124, and such as to perform operations with respect to the document 114 and its metadata, and can receive responses from it, such as using the output elements 125.

In another possible implementation, the one or more user stations 130 can each include one or more storage elements 131, one or more processors 132, security information 133 (such as, similarly, a key-pair in an asymmetric cryptographic technique, or a variant thereof), one or more input elements 134, one or more output elements 135, one or more associated users 136, a communication link 117 with the cloud-based controller 110, and (optionally) a network communication link 137 with the network link 150. The one or more processors 132 can collectively control user station 130. In such cases, one or more users 127 can be associated with the collaboration server 120, and can make requests of it, such as using the input elements 134, and such as to perform operations with respect to the document 114 and its metadata, and can receive responses from it, such as using the output elements 135.

In such cases, one or more users associated with the collaboration server 120, and can make requests of it, such as using the input elements 124, and such as to perform operations with respect to the document 114 and its metadata, and can receive responses from it, such as using the output elements 125.

In another possible implementation, the out-of-band communication link 140 can include a path from a particular user 136 associated with a first user station 130 (sometimes called the "sending user 141" herein), to a printer 142, such as might occur if the sending user 141 directed the private key associated with the security information electronically to the printer 142. In such cases, the printer 142 can provide a physical printed output 143, such as a sequence of alphanumeric characters or a pattern of white space, gray and black ink, or a color output. In such cases, this possible implementation is subject to many variations.

For one example, the printed output 143 described above can be printed in color, or the pattern described above can be printed in both color and gray. For another example, the printed output 143 can be structured so that it can only be seen with perspective, or using 3D glasses, or using some other form of vision-altering technique. For another example, the printed output 143 can be structured so that it mimics an eye test for color-blindness, with the effect that the only persons who would see the correct private key would be those persons who had a particular type of color-blindness. In such cases, this particular type of color-blindness could be imitated using color-filtered glasses, or using glasses with one color filter for one eye and another color filter for the other eye. For another example, the printed output 143 can be mangled, or otherwise damaged, such as by cutting it along an unusual pattern, or such as by folding it and then cutting it. This example would allow separated portions to be transported physically and separately, or to be scanned and transported separately, until they reach a selected location, such as a scanner 144, from there, to a user station 120 to a recipient 145 (sometimes called the "recipient user station 145" herein), and from there, to a recipient user.

In such cases, the sending user has thus sent the message in a secure form from the sending user to the recipient user, and without substantial possibility of interception, either by an adversary inside the cloud-based system 110, or by an adversary outside the cloud-based system 110.

5.4 Method Flow Points and Steps

FIG. 2 shows a conceptual drawing of a method.
FIGS. 2A-2G are sometimes collectively referred to herein as "FIG. 2".

5.4.1 Method Steps

In one embodiment, a method 200 includes flow points and method steps as described herein, other elements shown in the figure, and possibly other elements. Not all flow points or method steps are required. Flow points or method steps should be considered optional, unless otherwise specified or unless clearly obvious for operation of the system.

The method 200 can be performed by the system 100 or portions thereof. Where described herein that a flow point is reached, or a step is performed, by the method 200, it should be understood from the context, or from the figure, which portion of the system 100, or all of it, reaches the flow point or takes the actions to perform the step.

Although the nature of text necessitates that the flow points and steps are shown in a particular order, in the context of the invention, there is no reason for any such limitation. The flow point may be reached, and the steps may be performed, in a different order, or may be performed by co-routines or recursive functions, or may be performed in a parallel or pipelined manner, and/or otherwise.

Securely Sending a Document-I

A flow point 200A indicates that the method 200 is ready to send a document and at least a portion of its metadata from a sending user 141 to a recipient user 145. As part of this flow point, the method 200 can initialize or reset any appropriate values, and reset/set the method's state, as appropriate.

At a step 201, the method 200 sends and out-of-band message from the sending user 141 to the recipient user 145, requesting a public key for the recipient user 145.

At a step 202, the method 200 inserts the public key for the recipient user 145 into a physical object, such as a printed page. As part of this step, the method 200 can (optionally) embed the public key into the physical object in a manner that is human-readable but not machine readable. For one example, the method 200 can embed the public key into the physical object using ASCII art on a printed page. For another example, the method 200 can embed the public key into the physical object using a "Captcha" photograph.

At a step 203, the method 200 encrypts the protected metadata associated with the document using that public key, thus making the message readable only by the recipient user 145, or by someone with the printed page.

At a step 204, the method 200 sends the physical object from the sending user 141 to the recipient user 145. For one example, the method 200 can send the printed page to a scanner near the recipient user 145, which can scan the printed page and send the digital results to the recipient user 145.

At a step 205, the method 200 directs the recipient user 145 to decode the public key from the digitized physical object, and to decrypt the document and its metadata.

A flow point 200B indicates that the method 200 has completed sending the document and at least a portion of its metadata from the sending user 141 to the recipient user 145. In one possible implementation, the method 200 repeats the process from the flow point 200A, until stopped.

Securely Sending a Document-II

In one implementation of securely sending a document, the method 200 need not send an out-of-band message as in the step 201 above, and instead can perform the following steps:

At a first alternative step following the flow point 200A, the sending user 141 can know the public key for the recipient user 145.

At a second alternative step following the first alternative step, the sending user 141 can securely send a document to the recipient user 145, encrypted using the recipient's public key. The recipient user 145 can securely decrypt the document using its own private key.

At a third alternative step following the first alternative step, the sending user 141 can securely send its own public key to the recipient user 145 in the document's metadata, encrypted using the recipient's public key. The recipient user 145 can securely decrypt the document's metadata using its own private key, with the effect of obtaining the sender's public key. The recipient can reply to the sender using the sender's public key, and the sender can decrypt the reply using its own private key.

There is no particular requirement for any private key to be sent or shared in the clear at any time.

Securely Sending a Document-III

In another implementation of securely sending a document, the method 200 need not send an out-of-band message as in the step 201 above, and instead can perform the following steps:

At a first alternative step following the flow point 200A, the sending user 141 and the recipient user 145 can use Diffie-Hellman secure key exchange, or a variant thereof, to create and exchange a nonce key-pair.

At a second alternative step following the first alternative step, the sending user 141 can securely send the document and its metadata to the recipient user 145, encrypted using the public key in the nonce key-pair, with the effect that no unauthorized party can obtain either the document or its metadata. The recipient user 145 can securely decrypt the document and its metadata using the private key associated with the nonce key-pair.

At a third alternative step following the first alternative step, the sending user 141 and the recipient user 145 can exchange documents and their metadata, each encrypting them using the public key associated with the nonce key-pair, and each decrypting them using the private key associated with the nonce key-pair, with the effect that no unauthorized party can obtain either the document or its metadata.

As described above, there is no particular requirement for the any private key to be sent or shared in the clear at any time.

Further Multi-Hop Security Assurances

A flow point 210A indicates that the method 200 is ready to provide further security assurances at a particular hop in a multi-hop document transfer. As part of this flow point, the method 200 can initialize or reset any appropriate values, and reset/set the method's state, as appropriate.

At a step 211, the method 200 receives the document from the hop closer to the sending user 141, that is, the document is sent from earlier in the multi-hop chain to one hop later in the multi-hop chain.

At a step 212, the method 200 determines that the user is authorized to receive the message in the multi-hop chain. The method 200 can require a password or other challenge-response authentication, or can determine whether the user is authorized in response to biometric information. In the latter case, the method 200 logs the biometric information or the challenge-response query and results, and appends that log to the document. As part of this step, the method 200 de-crypts the document using the public key, re-encrypts the document using a new key-pair, and publishes the new private key in either (A) the human-readable portion of the document, or (B) the metadata associated with the document.

At a step 213, the method 200 (optionally) records a time/place log of where the document has been in the multi-hop chain. As part of this step, the method 200 (optionally) records the results of the just-previous step 212.

A flow point 210B indicates that the method 200 has completed providing further security assurances at a particular hop in a multi-hop document transfer. In one possible implementation, the method 200 repeats the process from the flow point 210A, until stopped.

Collaboration with Encrypted Documents-I

A flow point 220A indicates that the method 200 is ready to proceed with more than one user collaborating on reading or editing a document and its metadata, while the document is maintained encrypted against all other users as potential adversaries. As part of this flow point, the method 200 can initialize or reset any appropriate values, and reset/set the method's state, as appropriate.

At a step 221, the method 200 "checks out" the collaborative document to a first particular user. As part of this step, the method 200 decrypts the document and its metadata from the encrypted form it had when stored in the collaborative storage, re-encrypts the document using the public key for the first particular user, and informs the first particular user that the document and metadata are ready for reading and editing.

At a step 222, the method 200 waits while the first particular user reads and edits the document and its metadata. As part of this step, the method 200 acts on any "active tags" (as described in the included documents) associated with the document.

At a step 223, the method 200 directs the first particular user to re-encrypt the document and its metadata so that the collaborative storage system can read them. As part of this step, the method 200 re-encrypts the document and its metadata with the public key for the collaborative storage system.

At a step 224, the method 200 "checks out" the collaborative document to a second particular user. As part of this step, the method 200 decrypts the document and its metadata from the encrypted form it had when stored in the collaborative storage, re-encrypts the document using the public key for the second particular user, and informs the second particular user that the document and metadata are ready for reading and editing.

At a step 225, the method 200 waits while the second particular user reads and edits the document and its metadata. As part of this step, the method 200 acts on any "active tags" (as described in the included documents) associated with the document.

At a step 226, the method 200 directs the second particular user to re-encrypt the document and its metadata so that the collaborative storage system can read them. As part of this step, the method 200 re-encrypts the document and its metadata with the public key for the collaborative storage system.

A flow point 220B indicates that the method 200 has completed more than one user collaborating on reading or editing a document and its metadata, while the document is maintained encrypted against all other users as potential adversaries. In one possible implementation, the method 200 repeats the process from the flow point 220A, until stopped.

Collaboration with Encrypted Documents-II

A flow point 230A indicates that the method 200 is ready to proceed with more than one user collaborating on reading or editing a document and its metadata, while the document is maintained encrypted against all other users as potential adversaries. As part of this flow point, the method 200 can initialize or reset any appropriate values, and reset/set the method's state, as appropriate.

At a step 231, the method 200 generates a nonce key-pair for use with collaborative reading and editing of the document and its metadata. As part of this step, the method re-encrypts the document and its metadata with the public key for the nonce key-pair.

At a step 232, the method 200 distributes the nonce key-pair to the first particular user and the second particular user, for use with collaborative reading and editing of the document and its metadata. As part of this step, the method re-encrypts the document and its metadata with the public key for the nonce key-pair.

At a step 233, the method 200 directs the first particular user and the second particular user to each read and edit the document and its metadata in turn, each decrypting it at their computing device for separate use. As part of this step, the first particular user and the second particular user each re-encrypt the document and its metadata with the public key for the nonce key-pair when they are done with the document and its metadata.

A flow point 230B indicates that the method 200 has completed more than one user collaborating on reading or editing a document and its metadata, while the document is maintained encrypted against all other users as potential adversaries. In one possible implementation, the method 200 repeats the process from the flow point 230A, until stopped.

Collaboration with Encrypted Documents-III

A flow point 240A indicates that the method 200 is ready to proceed with more than one user collaborating on reading or editing a document and its metadata, while the document is maintained encrypted against all other users as potential adversaries. As part of this flow point, the method 200 can initialize or reset any appropriate values, and reset/set the method's state, as appropriate.

At a step 241, the method 200 allocates a computing device to host a virtual machine with which to read and edit the document and its metadata. As part of this step, the method 200 decrypts the document and its metadata and makes them available to only the virtual machine.

At a step 242, the method 200 directs the virtual machine to receive (optionally, concurrent) requests from the first particular user and the second particular user, and to respond to those requests. As part of this step, the virtual machine maintains a current copy of the document and its metadata in virtual memory.

At a step 243, the method 200 directs that when the first particular user and the second particular user are done, the virtual machine re-encrypts the document and its metadata, and records the edited document and its metadata in the cloud-based system. As part of this step, the virtual machine can be deleted.

A flow point 240B indicates that the method 200 has completed more than one user collaborating on reading or editing a document and its metadata, while the document is maintained encrypted against all other users as potential adversaries. In one possible implementation, the method 200 repeats the process from the flow point 240A, until stopped.

5.5 Alternative Embodiments

5.5.1 Real-World Nature

After reading this Application, those skilled in the art would recognize that the invention is not directed solely to an "abstract idea." The invention does not encompass an "abstract idea" and all possible uses thereof, save only a relatively small set of such uses. Instead, this Application describes techniques (including patentable subject matter) that can make use of new concepts to provide useful and tangible results, including management of metadata with clouds. In at least one particular implementation, this Application provides "significantly more" than any singular "abstract idea." In at least one particular implementation, this Application describes techniques that can significantly improve the technologies of automated collaboration of reading and editing documents in a cloud-based system. Moreover, in at least another particular implementation, this Application describes techniques that provide meaningful limitations beyond generally linking an "abstract idea" to use of a generalized computing environment.

For one example, this Application describes techniques that provide significant improvements on ways that collaborative reading and editing can be performed on documents and metadata. This has the effect of providing significantly better ability to enhance and/or modify user interfaces for cloud service providers, without concern for the prospect of clashes between different cloud-based systems. For another example, this Application describes techniques that significantly transform the way that cloud service providers, and even ordinary computers, interact with each other, and interact with peripheral devices; this Application provides new and uniquely useful ways that metadata can be protected, thus providing new ways in which files can be manipulated and monitored with respect to cloud service providers, and also providing new ways in which peripherals can be used by cloud-based sharing systems.

5.5.2 Similar Elements or Steps

Individual elements or method steps of the described embodiments could be replaced with substitutes that perform similar functions in other contexts.

Elements of the system are described herein with respect to one or more possible embodiments, and are not intended to be limiting in any way. In the context of the invention, there is the particular requirement for any such limitations as described with respect to any elements of the system. For one example, individual elements of the described apparatuses could be replaced with substitutes that perform similar functions. Moreover, as described herein, many individual elements of the described apparatuses are optional, and are not required for operation.

Moreover, although control elements of the one or more described apparatuses are described herein as being executed as if on a single computing device, in the context of the invention, there is no particular requirement for any such limitation. For one example, the control elements of the one or more described apparatuses can include more than one computing device (or more than one specialized computing device), not necessarily all similar, on which the element's functions are performed.

For one example, while some embodiments are generally described herein with respect to specific steps to be performed by generalized computing devices, in the context of the invention, there is no particular requirement for any such limitation. In such cases, subject matter embodying the invention can include special-purpose devices; and can include special-purpose hardware devices having the elements described herein, and having the effect of performing the steps described herein; and combinations and/or conjunctions thereof. Embodiments of the invention are not necessarily limited to computing devices, but can also include any form of device or method that can improve techniques for improving the effect of the machine operations described herein.

In one particular implementations, instructions capable of being interpreted for control of devices can be provided as a computer program product, such as instructions that are maintained on a computer-readable storage medium or a non-transitory machine-readable medium. The non-transitory medium can include a magnetic, optical or magneto-optical storage medium; a flash storage medium; and/or otherwise.

5.5.3 Specification Not Limiting

After reading this Application, those skilled in the art would recognize that the invention is not limited to only the specifically described embodiments, that many variations are within the scope and spirit of the invention, and would be workable without undue experiment or further invention.

5.5.4 Claims Included in Specification

The Claims in this Application are hereby included by reference in the text of the Specification.

The invention claimed is:

1. Apparatus including a cloud-based collaborative storage system, maintaining one or more cloud-based documents and metadata associated with each cloud-based document, the metadata being separately accessible from its associated document, said cloud-based collaborative storage system associating at least one set of sender security keys with the document, the sender security keys being associated with a user providing the document, and associating at least one set of receiver security keys with the metadata, the receiver security keys being associated with a recipient of the document, at least part of the receiver security keys being stored in the metadata;

a first process encrypting the document with the sender security keys, associating at least part of the sender security keys with the metadata, and encrypting the metadata with a receiver security key;

a second process sending the encrypted document and the encrypted metadata to the recipient;

a multi-hop out-of-band communication channel coupled to said first and second device, said channel not coupled to any communication channel within said storage system;

wherein a message on said out-of-band communication channel cannot be intercepted within said storage system, and a message within said storage system cannot be intercepted on said out-of-band communication channel.

2. Apparatus as in claim 1, including
a folder maintaining one or more security keys to one or more tags.

3. Apparatus as in claim 2, wherein
said folder is responsive to any one or more of said security keys.

4. Apparatus as in claim 1, including
a tag maintaining a secure session of access to a secure document.

5. Apparatus as in claim 1, including
a virtual machine decrypting said one document, receiving requests to edit said one document from said first and second devices, and responding to said requests;
said virtual machine responding to said first signal to maintain an editable version of said one document, and to said second signal to store said one document re-encrypted in said storage system.

6. Apparatus as in claim 1, including a printer coupled to said first device and out-of-band communication channel, said printer providing a printout of one security key;
said second device coupled to said printer, and responsive to said one security key.

7. Apparatus as in claim 1, wherein said message on said out-of-band channel includes a strand of biological material maintaining information.

8. Apparatus as in claim 1, including
one or more of: encryption keys, decryption keys, maintained in metadata associated with a document.

9. Apparatus as in claim 8, wherein
said document includes a cloud-based document; and
said cloud-based document is maintained secure
by one or more of: said cloud-based collaborative storage system, said security server, said first or second device.

10. Apparatus as in claim 8, wherein
one or more of: said cloud-based collaborative storage system, said security server, said first or second device,
maintains said metadata secure against access by unauthorized parties.

11. A method, including steps of maintaining a document on a storage device, the document being associated with metadata, the metadata being separately accessible from said document;
associating one or more sender encryption and decryption keys with the document, the sender encryption and decryption keys being associated with a user providing the document;
storing a receiver encryption and decryption key in the document metadata, the receiver encryption and decryption key being associated with a recipient of the document;

encrypting the document with the sender encryption keys, associating the sender decryption keys with the document metadata, and encrypting the document metadata with the receiver encryption key;

sending the encrypted document and the encrypted metadata to the recipient;

whereby decryption of the encrypted metadata and decryption of the document using the metadata provides the original document;

using a multi-hop out-of-band communication channel coupled to said first and second device, said channel not coupled to any communication channel within said storage system;

wherein a message on said out-of-band communication channel cannot be intercepted within said storage system, and a message within said storage system cannot be intercepted on said out-of-band communication channel.

12. A method as in claim 11, wherein
the steps of encrypting the document with the sender encryption key include steps of
separating the document into a first document portion and a second document portion;
associating a first sender encryption and decryption key with the first document portion and a second sender encryption and decryption key with the second document portion;
associating the first and the second sender decryption keys with the document metadata.

13. A method as in claim 11, wherein
the steps of sending the encrypted document include steps of
sending the encrypted document to a multi-hop path to the recipient;
at one or more hops on the path, associating the document with additional encryption and decryption keys;
providing the additional decryption keys to the recipient.

14. A method as in claim 13, wherein
the multi-hop path maintains an log of sending one or more of: the document, the metadata.

15. A method as in claim 13, wherein
the multi-hop path provides additional information at one or more hops on the path.

16. A method as in claim 11, wherein
the steps of sending the encrypted metadata include steps of
separating the metadata into a first metadata portion and a second metadata portion;
sending the first metadata portion and the second metadata portion separately to the recipient.

17. A method as in claim 11, wherein
the steps of sending the encrypted metadata include steps of
storing the encrypted metadata with a trusted third party;
providing access to the trusted third party to the recipient.

18. A method as in claim 11, wherein
the steps of sending the encrypted metadata include steps of
generating a nonce key-pair associated with the metadata;
providing the nonce key-pair to the recipient.

19. Apparatus as in claim 5, wherein
the virtual machine periodically
decrypts the document;
incorporates changes from the sender or recipient;
re-encrypts the document.

* * * * *